March 23, 1965  C. A. FLARSHEIM  3,174,490

FILTER WASHING MACHINE

Filed March 20, 1961  3 Sheets-Sheet 1

INVENTOR.
Clarence A. Flarsheim
BY
Harvey, Schmidt, Johnson & Harvey
ATTORNEYS.

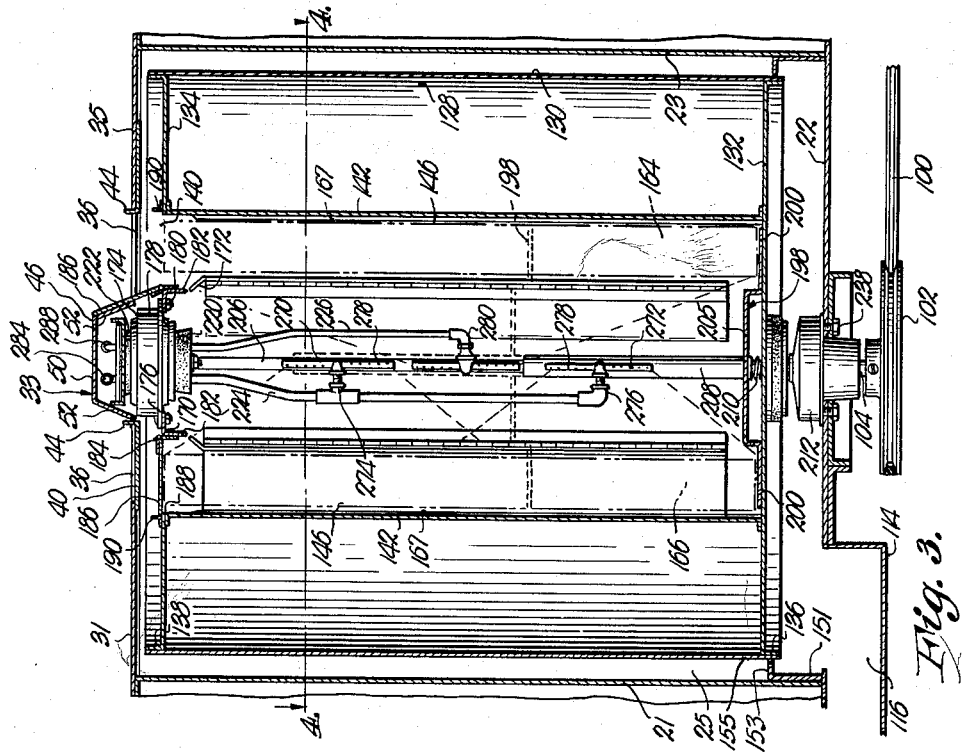
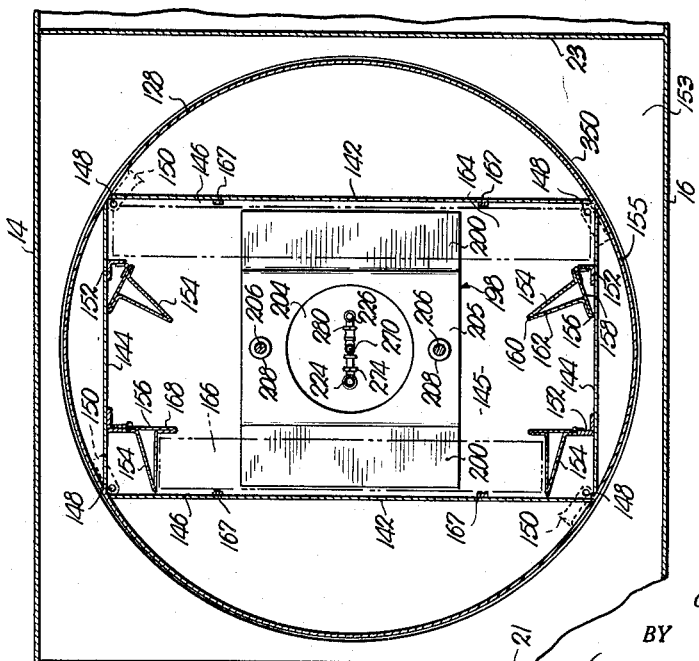

March 23, 1965 C. A. FLARSHEIM 3,174,490
FILTER WASHING MACHINE
Filed March 20, 1961 3 Sheets-Sheet 3

INVENTOR.
Clarence A. Flarsheim
BY
Hovey, Schmidt, Johnson & Hovey
ATTORNEYS.

3,174,490
FILTER WASHING MACHINE
Clarence A. Flarsheim, 6131 Mission Drive,
Shawnee Mission, Kans.
Filed Mar. 20, 1961, Ser. No. 96,892
10 Claims. (Cl. 134—80)

This invention relates to apparatus for cleaning and treating a member, especially a foraminous member, in the nature of an air filter principally used for removing air-borne dust and solid particles from air wholly or partially supplied to a given region.

Panel-type air filters are used for the aforementioned purpose, although several other types of filters and method of filtering are commercially available. This application relates to the cleaning and treating of the panel-type air filters which are by far the type which is most widely used.

The principal purpose of air filters is to improve health, comfort, and general cleanliness in enclosures for human habitation such as office buildings, department stores, schools, factories, hospitals, churches, and also residential homes. Air filters also contribute to the precision of laboratory processes, as well as many industrial and manufacturing operations, by cleaning the air supplied to the regions where the processes and operations take place. The desirability of, and need for air which is clean and free from contamination, is well-known and calls for no further elaboration in this application other than to state that, if air filters are to be reused, it is obviously necessary to re-clean and treat the filters periodically to restore them to a condition approximating their original efficiency and performance.

Air filters of the aforementioned type usually comprise a quantity of wire mesh secured to a substantially rigid, rectangular frame and inserted in a rack within the path of travel of air supplying the enclosure. The number of such filters may vary from a single filter panel to a plurality of such filters arranged so that the same form a bank across the path of travel of the air. The sizes of panel filters are somewhat standardized as to length, width and thickness. The size or sizes selected in any special instance, depend mostly upon the physical aspects of the air supply system for the particular enclosure.

The air passing through the filters is cleansed by depositing the dust and solid air-borne particles on the tacky, adhesive material with which the wire mesh of the filters has been previously coated. The particles removed from the air remain attached to the adhesive, and thus to the wire mesh until such time as the filters are cleaned.

Heretofore, common practice has called for the removal of the filters from the supporting structure, the transporting of the filters to a point remote from their point of use, and the subsequent cleaning of the filters by removing the dirt and adhesive from the wire mesh. Thereupon, the filters were again coated with an adhesive, returned to their point of use and re-inserted into the supporting structure within the path of travel of the air. It is apparent that this method of cleaning requires a considerable amount of labor since the filters first must be removed to a point remote from the point of use thereof to be cleaned and treated, and then returned and re-installed in the filter bank.

In addition to the time and labor required for transporting the filters to and from the point of cleaning and treating, an even greater expenditure of time and labor is necessary with present methods for the actual cleaning and treating operations, as well as for their temporary storage when the filters are not in use.

The inconvenience and disturbance associated with the transporting of the filters, both to and from the point of use thereof, are at times highly objectionable and damaging to the surroundings, as well as discomfiting to personnel in the enclosed region. Attempts to rectify these problems, such as having a complete set of spare, clean filters for replacing the dirty filters so removed, have been costly and for the most part, unsatisfactory.

The present invention provides apparatus for cleaning and treating of the filters of the aforementioned character once the filters have been removed from their supporting racks located in the path of travel of the air. This is accomplished principally by making feasible the cleaning and treating of the filters at or near the point of use thereof, thus eliminating the problems enumerated above. To this end, structure is provided for first cleaning and then coating with adhesive the surface of the wire mesh of the filters. The filters, after being cleaned and coated with an adhesive in a tacky condition, are subsequently reinserted in the supporting racks, the cleaning and treating process requiring only a short interval of time.

The apparatus which forms the subject of this invention is either wholly self-contained or adapted to be operably coupled to utilities comprising an electrical outlet, a source of water at conventional pressure, and a waste drain for disposing of waste materials. These utilities are usually provided adjacent or near the point of use of aforementioned air filter installations. Furthermore, the apparatus of the present invention is movable to and from various locations at which the filters are disposed. The full utilization of this apparatus may be achieved by a single operator.

It is, therefore, the primary object of the present invention to provide apparatus for cleaning and treating a member, such as an air filter, at or near the point of use thereof to thereby preclude the removal of the same to a station remote from its point of use for such processing.

Another important object of the present invention is the provision of apparatus for cleaning and treating air filters spaced at various locations in an area, whereby the apparatus may be moved to the said locations to clean and treat the filters at or near the point of use thereof.

A further object of the present invention is the provision of apparatus including an enclosure adapted to receive therewithin filters to be cleaned and treated, which enclosure is constructed in such a manner to confine the cleaning and treating processes and thus preventing harmful or damaging effects to property within the region in which the apparatus is utilized, including contamination occurring in the region from the use of cleaning and treating agents.

Yet another object of the present invention is the provision of apparatus for cleaning and treating a filter of the above-mentioned type, by initially rotating the filter at a relatively high speed to utilize the cleaning effect of centrifugal force on the filter prior to the application thereto of cleaning and treating solutions.

A further object of the present invention is the provision of apparatus for applying a treating fluid in the form of an adhesive in a heated state to the filter after the same has been cleaned by a cleaning fluid, whereby, upon cooling of this treating fluid on the surface of the wire mesh of the filter, the cooled treating fluid being in a tacky condition, thereby captures and retains solid air-borne particles passing through the filters.

Yet another object of the present invention is the provision of apparatus for rotating air filters to be cleaned and treated and applying to the filters, while the same rotate, a cleaning solution whereby the filters are effectively cleaned while the excess cleaning solution is simultaneously removed therefrom by centrifugal force, and subsequently applying to the filters, while the same rotate, a treating fluid whereby the filters are effectively treated while the excess treating fluid is simultaneously removed by centrifugal force.

Other objects of the present invention relate to the provision of sequential timer means operably coupled to the means for rotating filters and means for delivering fluid thereto, whereby the process of cleaning and treating the filters may be made automatic and independent of operator action; to the provision of sump means carried by a housing containing the rotating filters whereby the waste fluids removed from the filters during the rotation thereof, may be collected in the sump and removed to a point of disposal remote from the housing; to the provision of means for introducing a cleaning solution into a water line operably coupled to the fluid delivery means, whereby the filters may be cleaned with the solution prior to the treating thereof with a treating fluid; to the provision of valve means for controlling the flow of cleaning and treating fluids to the filters, whereby the amount and the sequence of the application of the fluids may be controlled to within small intervals of time; to the provision of brake means carried by the drive motor which rotates the enclosure containing the filters, whereby the rotation may be halted after the filters have been cleaned and treated; and to the provision of electrically conducting switch means for initiating the cleaning and treating process, and for deactuating the system when it is so desired, whereby the operator thereof has complete control over the machine at all times.

Other objects of the present invention will become apparent as the following specification progresses, reference being had to the accompanying drawings, wherein:

FIG. 3 is an enlarged, fragmentary, cross-sectional, side elevational view of the enclosure for receiving therein filters to be cleaned, which enclosure forms a portion of the present invention;

FIG. 4 is an enlarged, fargmentary, cross-sectional plan view taken along line 4—4 of FIG. 3;

Figure 8:
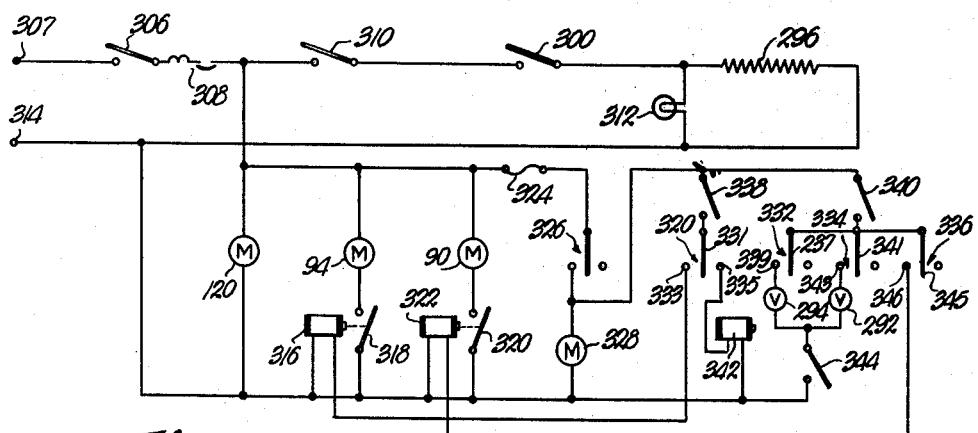

FIG. 8 is an electrical wiring diagram schematically illustrating one manner of interconnecting the control means for operating the machine which forms the subject of the present invention; and FIG. 9 is an enlarged, fragmentary, cross-sectional, side elevational view of an L-shaped tube illustrating such tubes which are secured to the rotatable enclosure at the discharge ports thereof for permitting the waste products passing through the discharge ports to be directed downwardly and rearwardly of the direction of rotation of the enclosure.

Figure 1:
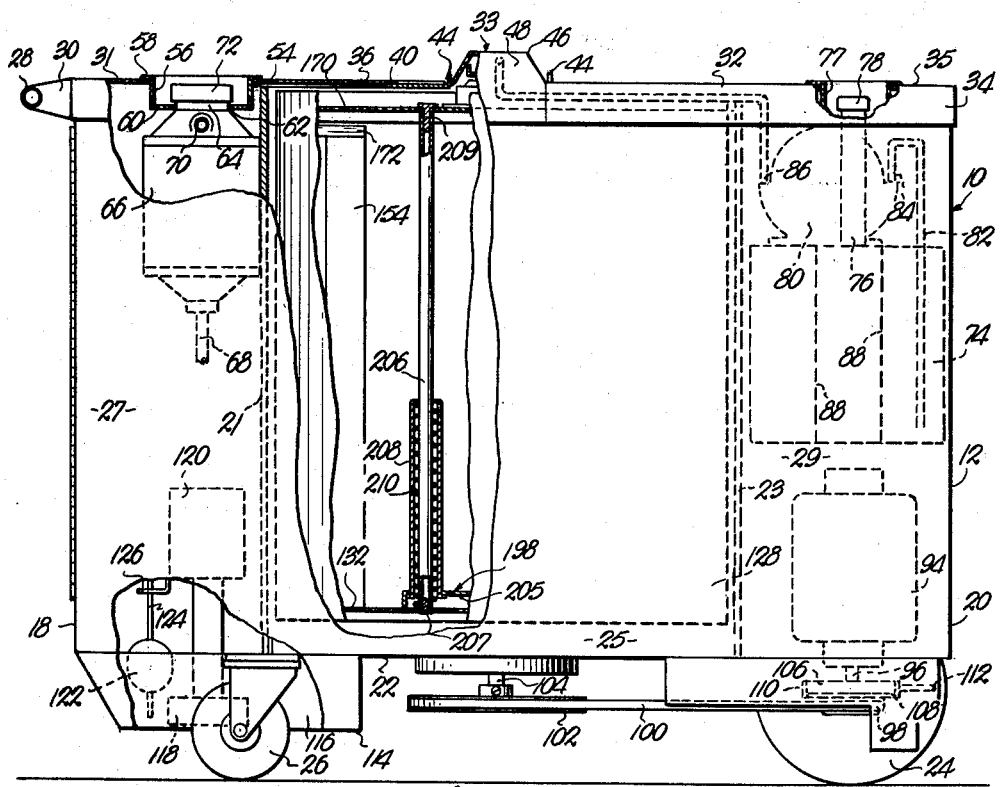
FIGURE 1 is a fragmentary, cross-sectional, side elevational view of the machine which forms the subject of the present invention.
Figure 2:
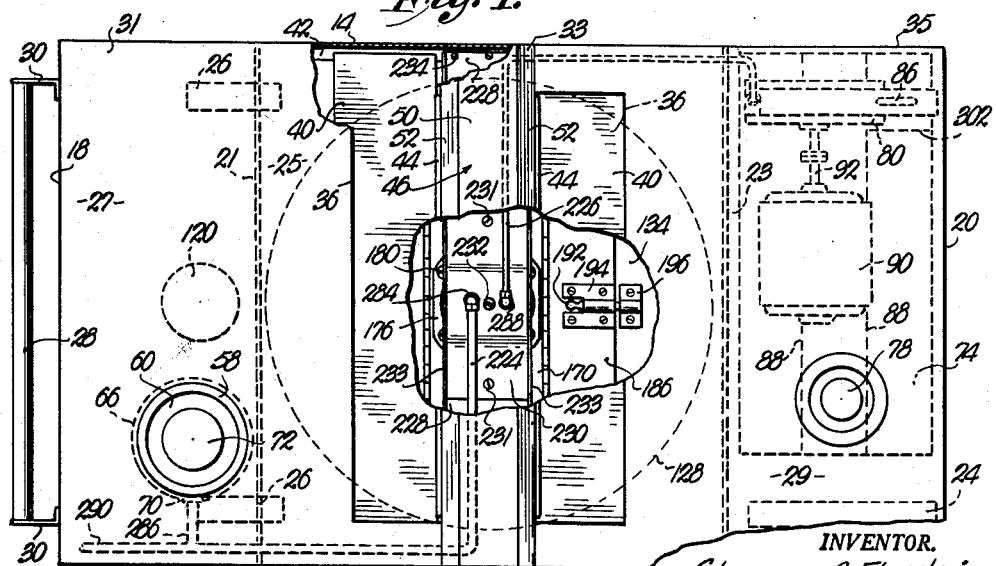
FIG. 2 is a fragmentary, cross-sectional plan view of the machine illustrated in FIG. 1.

As illustrated in FIGS. 1 and 2, the machine which forms the subject of the present invention is broadly denoted by the numeral 10, and the same includes a housing 12, provided with a pair of side walls 14 and 16, a pair of end walls 18 and 20, and a bottom wall 22 secured in a suitable manner to side walls 14 and 16 and end walls 18 and 20 to form a hollow, open top container for receiving therein the filters to be cleaned. As viewed in FIGS. 1 to 4, a pair of intermediate end walls 21 and 23 are disposed in spaced relation between end walls 18 and 20 and span the distance between side walls 14 and 16. Intermediate walls 21 and 23 separate housing 12 into a central compartment 25 and end compartments 27 and 29.

As shown in FIGS. 1 and 2, a pair of stationary casters 24 are secured to suitable axle means mounted on bottom wall 22 beneath end compartment 29, and a pair of casters 26 are mounted on bottom wall 22 beneath end compartment 27 for swivel movement about vertical axes. Casters 24 and 26 permit housing 12 to be capable of shifting movement and casters 26 further permit the movement to be directional. A locking device may be disposed on one or both of casters 26 to prevent the movement of housing 12 when it is desired to maintain the latter in a fixed position.

As illustrated in FIGS. 1 and 2, a handle 28 is operably coupled by means of a pair of L-shaped brackets 30 to an end portion 31 which covers end compartment 27 and a part of central compartment 25 of housing 12. An end portion 35 covers end compartment 29 and another part of compartment 25 and a central portion 33 covers the part of central compartment 25 not covered by end portions 31 and 35. Portions 31, 33 and 35 thus form a top 32 which covers the open upper end of housing 12. Portions 31, 33 and 35 are best illustrated in FIGS. 1 and 2 and are shown in FIG. 1 as being provided with a flange 34 depending therefrom and secured thereto at the outermost peripheral edges thereof, flange 34 being substantially continuous, and surrounding side walls 14 and 16 and end walls 18 and 20 when top 32 is disposed on housing 12. Flange 34 serves as a guide for properly mounting top 32 on housing 12 and further permits the mounting of brackets 30 on end portion 31.

In FIG. 2, it is seen that end portions 31 and 35 of top 32 are provided with a pair of spaced, parallel slots 36 therein permitting access to the interior of housing 12 when top 32 is positioned on the latter. Each of slots 36 is provided with an elongated access door 40 slidably mounted at the ends thereof on an L-shaped beam 42 secured to each of side walls 14 and 16 and at the upper extremities of the latter. Doors 40 may be shifted into and out of closing relationship to the corresponding slots 36 by an operator of machine 10. A projection 44 on each of doors 40 at the longitudinal edge thereof proximal to the center of portion 31, provides a means for grasping door 40 by the operator of machine 10 so that the door may be shifted in the desired direction.

Central portion 33 of top 32 is provided with a hollow cap portion 46 formed from a pair of raised sections 48 on central portion 33 adjacent and extending upwardly from flange 34 thereof. A top strip 50 interconnects the uppermost marginal edges of sections 48 and a pair of side strips 52 interconnect the proximal side marginal edges of sections 48 as is clear in FIG. 2 of the drawings.

As is clear in FIG. 1, end portion 31 of top 32 is provided with an opening 54 therethrough intermediate the marginal edges thereof for receiving therein a sleeve 56 having an annular flange 58 therearound at one end thereof in engagement with end portion 31 when sleeve 56 is within opening 54. Sleeve 56 may be secured to end portion 31 in any suitable manner, or sleeve 56 may be press-fitted within opening 54 to rigidly interconnect the same to portion 31.

As is evident in FIG. 1, an end wall 60, provided with an opening 62 therein, receives the neck portion 64 of a tank 66 when end portion 31 of top 32 is disposed over end compartment 27. Tank 66 is secured to intermediate wall 21 by bracket means (not shown). Tank 66 is provided with an inlet 68 and an outlet 70 for permitting fluids to enter into, and issue therefrom respectively. Tank 66 is adapted to be filled through an opening in the top thereof adjacent the neck portion 64 thereof with a cleaning solution. A cap 72 closes the filling end of tank 66 and is located below the plane of end portion 31 as illustrated in FIG. 1. Cap 72 thereby prevents the inadvertent entrance of foreign matter into tank 66 and also permits pressure to be maintained within the latter as the aforementioned cleaning solution is directed outwardly from the outlet 70 thereof.

In FIGS. 1 and 2, it is seen that a reservoir 74 is disposed within end compartment 29 and is secured to side wall 14 and intermediate wall 23 by bracket means (not shown). Reservoir 74 contains a treating fluid for treating members to be cleaned and treated by machine 10 by a method hereinafter described. The fluid to be contained in reservoir 74 is put into the latter through a tube 76 projecting upwardly from reservoir 74 and projects through an opening in a sleeve 77 much in the nature of sleeve 56 for tank 66 as described hereinabove. A cap 78 closes the open upper end of tube 76 and is disposed within the interior of sleeve 77 as shown in FIG. 1.

In FIGS. 1 and 2, it is shown that a fluid pump 80 is mounted on the top wall of reservoir 74 for pumping fluids from the interior of the latter to a point of use remote from reservoir 74. To this end, an inverted J-shaped tube 82 is placed in fluid communication with pump 80 and extends to a point near the bottom of reservoir 74. The purpose of the shape of tube 82 is to maintain a level of fluid in upright stretch 84 at all times to effect a liquid seal. It is seen that with the vertically disposed tubes at the inlet and outlet of the pump 80, when the latter ceases operation, the same remains in a flooded condition and thereby, primed to enable it to pump fluid from reservoir 74 immediately upon being actuated again. Thus, when pump 80 is initially actuated by an electric motor 90, coupled thereto by shaft 92, fluid is immediately pumped out of the discharge outlet 86 of pump 80 and continues to be pumped therefrom so long as motor 90 is in operation.

As shown in FIGS. 1 and 2, a pair of baffles 88 are provided within reservoir 74 to prevent sloshing of the fluid contained in the latter as housing 12 is moved. Baffles 88 span the distance between the end walls of reservoir 74 and also span the distance between the top and bottom walls thereof. A plurality of semicircular openings (not shown) are disposed in baffles 88 at the lowermost marginal edges thereof so as to interconect the three compartments formed by baffles 88. As illustrated in FIG. 1, tube 82 extends toward the bottom wall of reservoir 74 between one of baffles 88 and one of the side walls of reservoir 74.

In FIG. 1, positioned below reservoir 74 in end compartment 29, is an electric drive motor 94 having an output shaft 96 extending downwardly therefrom to a point beneath bottom 22 of housing 12. Shaft 96, as illustrated in FIG. 1, is operably coupled with a first pulley 98 over which an elongated, continuous belt 100 passes for imparting rotation to a second pulley 102 and a shaft 104 connected to the latter, and horizontally spaced from first pulley 98. A brake 106 is operably coupled with shaft 96 and includes a disc 108 integral with first pulley 98 and an annular flange 110 integral with disc 108 adapted to be engaged by a pair of relatively shiftable brake shoes (not shown) actuated by a cam (not shown) engageable with the ends of the brake shoes by virtue of the rotation of a rod 112 extending outwardly from brake 106 as viewed in FIG. 1. Rod 112 is rotatable about a vertical axis parallel to the axis of rotation of shaft 96. Thus, brake shoes are moved laterally relative to shaft 96 and away from the latter to engage the flange 110 of disc 108. Such engagement is sufficient to bring to rest the disc 108 and thereby, first pulley 98, and likewise bring to rest pulley 102 and shaft 104 by means of belt 100.

In FIG. 1, it is seen that bottom wall 22 is provided with a depression 114, extending between side walls 14 and 16 and substantially underlying end compartment 27 and partially underlying central compartment 25. Depression 114 defines a sump 116 for receiving therein fluids gravitating from a point above bottom wall 22. A waste pump 118 is disposed within sump 116 and is operably coupled to a motor 120 disposed thereabove and controlled in a manner so as to actuate pump 118 for removing the fluids from within sump 116. A buoyant ball of suitable material is positioned adjacent pump 118 and is shiftably mounted on the external casing of motor 120 by virtue of an elongated rod 124 and brackets 126, the latter being secured to the said casing to permit rod 124 and thereby ball 122, to rise and fall responsive to the level of fluids within sump 116. Ball 122 is further operably coupled through rod 124 to switch means to prevent accidental overflow of fluids from sump 116 should the rate of removal of fluid from said sump become inadequate because of pump failure or other causes.

An enclosure in the form of a cylindrical drum 128, illustrated in FIGS. 3 and 4, is disposed within central compartment 25 for containing filters to be cleaned and treated. Drum 128 is centrally positioned between end walls 14 and 16 and intermediate walls 21 and 23 for rotation about a vertical axis passing through the axis of revolution of the cylindrical side wall 130 of drum 128.

As is clear in FIG. 3, drum 128 is further provided with a bottom wall 132 closing one end of side wall 130 and a top wall 134 closing the other end of side wall 130. Bottom and top walls 132 and 134 of drum 128 are circular in plan form and are provided with annular flanges 136 and 138 respectively, which engage the inner surface of side wall 130 at the uppermost and lowermost ends thereof. Walls 132 and 134 are secured in a suitable manner to side wall 130.

Top wall 134 is provided with a substantially rectangular opening 140 therein which serves as the upper open end of a rectangular box structure formed by a pair of spaced, vertically disposed side walls 142, and a pair of spaced, vertically disposed end walls 144 interconnecting side walls 142. Side walls 142 span the distance between bottom and top walls 132 and 134 of drum 128 and are equally spaced on opposed sides of the axis of revolution of cylindrical side wall 130. Side walls 142 are interconnected at the vertical marginal edges thereof by end walls 144, as best seen in FIG. 4 of the drawings. Walls 142 and 144 surround a rectangular space 145 within drum 128 for receiving the filters to be cleaned and treated.

Bottom wall 132 of drum 128 is provided with a discharge outlet 148 therethrough at each corner of the space 145 formed by walls 142 and 144 for permitting fluids within the space to be discharged therefrom by gravitation. Outlets 148 are so positioned to effectively convey waste fluids from space 145, since the fluids would normally seek the corners of the rectangle formed by walls 142 and 144 by virtue of the centrifugal force thereon when drum 128 is placed in rotation.

As illustrated in FIG. 9, an L-shaped tube 150 is secured to bottom wall 132 of drum 128 at each of the outlets 148 thereof, causing the fluids passing through the latter to change direction and be discharged along a path parallel to bottom wall 132. Tubes 150, as shown in FIG. 9, are flared outwardly at the ends thereof remote from the ends connected to bottom wall 132. Since drum 128 is normally rotating during the cleaning and treating processes hereinafter set forth, tubes 150, by virtue of the flared ends thereof, serve to create partial vacuums in the regions of side walls 142, shown in FIG. 4, it being noted that drum 128 is rotated in a counterclockwise sense, as viewing FIG. 4, so that the flared ends of tubes 150 trail the ends thereof secured to bottom wall 132. As drum 128 rotates, a zone of reduced air pressure is created in the vicinity of the connection of tube 150 with bottom wall 132, thus drawing air away from space 145 in the vicinity of side walls 142 and into tubes 150. The partial vacuum caused by the tubes 150 within the space 145 is especially desirable in view of the fact that streams of fluid are directed through the mesh of filters to be cleaned and treated, then against side walls 142. The partial vacuum mentioned above, tends to support the desired direction of fluid flow through the filter mesh and at the same time serves to alleviate any tendency of the air within space 145 in the vicinity of side walls 142 to act as a buffer for the streams of fluid, which otherwise reduces the cleaning and treating effect of the fluids. To prevent the splashing of fluids issuing from tubes 150 and the rising of fluids within central compartment 25, a transversely L-shaped baffle 151, FIGS. 3 and 4, rests on bottom wall 22 of housing 12 and is provided with a horizontal portion 153 positioned above the bottom edge of side wall 130 of drum 128. Portion 153 is provided with a central opening 155 which clears drum 128 when the latter is disposed therewithin. Portion 153 confines the fluids to the area between bottom wall 132 of drum 128 and bottom wall 22 of housing 12, thus causing the fluids to gravitate to sump 116 rather than to splash upwardly.

As shown in FIG. 4, a pair of L-shaped, vertically disposed beams 152 are secured in horizontally spaced relationship to each end wall 144 and substantially span the distance between bottom wall 132 and top wall 134 of drum 128. Corresponding beams 152 on end walls 144 are aligned so that the inwardly projecting portions thereof parallel to side walls 142 form fixture guides with side walls 142 for larger width filters and also define regions 146 on opposed sides of space 145 for receiving filters to be cleaned and treated.

In FIG. 4, hingedly secured to each of beams 152, is an adaptor 154 having a V-shaped, transverse cross section, each adaptor 154 extending substantially the length of the corresponding beam 152. Each adaptor 154 is swingable about a vertical axis from a first position whereby the end 156 of a crosspiece 158 abuts or contacts the corresponding end wall 144 to a second position whereby the longitudinal edge 160 of a stretch 162 is in substantial abutment or contact with the proximal side wall 142. Adaptors 154 cause regions 146 to become adapted for use with filters of the aforementioned standard widths so that, when adaptors 154 are in said first position, regions 146 may receive filters of a first width, whereas when adaptors 154 are in said second position, regions 146 may receive filters of a second or smaller width. It is evident, therefore, that machine 10 is adapted to receive filters of two different widths by virtue of the construction and method of fastening of adaptors 154.

The adaptors 154 in FIG. 4 are shown in the first and second positions, one pair of adaptors 154 being in the first position to accommodate a filter 164 of a first width, the other pair of adaptors 154 being disposed in said second position to accommodate a filter 166 of a second or smaller width relative to the width of filter 164, it being noted that the filters are illustrated in dashed lines in FIGS. 3 and 4. In practice, however, it is advisable that filters of the same width be utilized within regions 146, but it is conceivable that machine 10 may be operable with filters of differing widths, such as, for instance, a filter 164 and a filter 166 disposed in the manner as shown in FIG. 4. Adaptors 154 position the filters to be cleaned so that the same are substantially symmetrical relative to the axis of revolution of drum 128 to eliminate any problems due to static and dynamic imbalance.

A pair of elongated spacer bars 167, in FIG. 4, are secured to each side wall 142 and extend between the top and bottom marginal edges of the latter. Bars 167 of each side wall 142 are horizontally spaced and provide bearing surfaces against which filters within regions 146 abut to maintain the filters out of contact with side walls 142 and thus provide a space to allow the waste fluids to gravitate to bottom wall 132 and then pass to outlet openings 148 in the latter.

As is noted in FIG. 4, the center of gravity of each of the adaptors 154 is on one side or the other of a line interconnecting the axis of revolution of drum 128 and the axis of pivotal movement of the corresponding adaptor 154. Thus, adaptors 154 would be maintained by centrifugal force as initially positioned in either of the aforesaid first and second positions during the rotation of drum 128. It is apparent that, when positioned for and retaining the smaller sized filter, the adaptors and filter would be substantially mutually locked in positions, except for vertical movement relative to region 146.

In FIGS. 2 and 3, a crossbeam 170 extends across opening 140 and spans the distance between end walls 144. Crossbeam 170 is substantially parallel to top wall 134 and secured to the latter and end wall 144 of drum 128 in a suitable manner. Crossbeam 170, as shown in FIG. 2, is provided with a central opening 172 therein for receiving projecting portions of a top bearing 174, the latter having a flanged section 176 secured to the outer race 178 thereof. Flanged section 176, as shown in FIGS. 2 and 3, is secured to crossbeam 170 by nut and bolt means 180 so that the outer race 178 is rigid to crossbeam 170.

In FIGS. 2 and 3, the longitudinal axis of crossbeam 170 is substantially parallel with side walls 142 and 144. Crossbeam 170 is in essence, a channel provided with a pair of spaced, longitudinally extending, downwardly directed legs 182 spanning the distance between end walls 144 for providing a support for hinges 184 which mount a pair of lids 186 thereon for rotation about horizontal axes parallel with the longitudinal axis of crossbeam 170. As shown in FIG. 3, lids 186 are utilized to close the open upper ends of regions 146 and thus span the distance between crossbeam 170 and the proximal side walls 142 when in a closed condition.

Lids 186, shown in FIGS. 2 and 3, are adapted to swing in vertical arcs to permit the insertion within regions 146 of filters to be cleaned and treated. When lids 186 close the open upper end of regions 146, lids 186 are supported on longitudinally extending projections 188 forming a part of top wall 134. A continuous L-shaped angle 190 circumscribes opening 140 and abuts those peripheral edges of lids 186 which are adjacent to angle 190 when lids 186 are in the closed position, as shown in FIG. 3. Angle 190 is secured to top wall 134 at the normally uppermost face thereof in a suitable manner. It is clear that lids 186 move away from the axis of revolution of drum 128 when the same are shifted into closing relationship to regions 146 so that the effect of the centrifugal force on lids 186 due to the rotation of drum 128 is to maintain the lids in the closed horizontal position.

As is clear in FIG. 2, to assure that lids 186 are maintained in closing relationship to regions 146, slide bolt 192 is shiftably carried within hollow, cylindrical element 194 on each lide 186. Each bolt 192 is movable into and out of locking engagement with a catch 196 secured to the top wall 134 of drum 128 adjacent each lid 186, and bolt 192 is spring-biased to normally be in engagement with catch 196 when the corresponding lid 186 closes the respective region 146.

FIG. 3 illustrates lids 186 in the closed and in the open positions thereof, the lid 186 in the open position being in substantial abutment with the corresponding strip 52 of central cap portion 46 so as to guide the filter to be inserted into the corresponding region 146. Provision in the nature of recesses, is made in the strips 52 to accommodate bolts 192 and elements 194 so that lids 186, when in the open position, are in continuous abutment along strips 52.

It is clear that lids 186, shown in FIGS. 2 and 3, must be aligned relative to slots 36 of the end portions 31 and 35 of top 32 to permit the lids 186 to swing to the open position, and to this end it is sometimes necessary to manually rotate drum 128 so as to align the longitudinal axes of lids 186 with the longitudinal axes of slots 36. When doors 40 are open, sufficient clearance is provided to swing lids 186 to the aforesaid open position to permit the insertion or removal of filters into and from regions 146.

A platform 198, as shown in FIGS. 1, 3 and 4, is disposed within space 145 to support a pair of filters to be cleaned and treated. Platform 198 comprises a pair of spaced, horizontal supporting surfaces 200 whose longitudinal axes are parallel to side walls 142 and bottom wall 132 of drum 128. Surfaces 200 are disposed within regions 146 to underlie the filters in supporting relationship thereto when the filters are inserted into regions 146. Surfaces 200 are disposed on opposed sides of a central circular opening 204 in the central portion 205 of platform 198 as shown in FIG. 4, the central portion 205 providing a support for cantilevering surfaces 200 by being vertically offset relative to the portions of platform 198 having surfaces 200.

Platform 198 is vertically slidable on a pair of laterally spaced, elongated, vertically disposed guide rods 206 positioned on the longitudinal axis of platform 198 on opposed sides of and equidistant from the central opening 204 in platform 198. As is clear in FIG. 1, each guide rod 206 is secured at the ends thereof to bottom wall 132 and crossbeam 170 by pins 207 and 209 respectively, passing into hollow bores in the ends of the corresponding rod 206.

Platform 198 depends from a pair of tubular sleeves 208, FIGS. 1 and 3, which surround guide rods 206 and are outwardly flared at the lowermost ends thereof, FIG. 3, to support central portion 205 of platform 198. The uppermost end of each of the sleeves 208 is inwardly flared and is engaged by the upper extremity of a coil compression spring 210 disposed within the sleeve 208 and surrounding the corresponding guide rod 206. The lower extremity of each spring 210 abuts and is supported by bottom wall 132 as shown in FIGS. 1 and 3. When springs 210 are not compressed, platform 198 assumes the dashed line position of FIG. 3. Springs 210 may be compressed to the point where platform 198 assumes the full-line position of FIG. 3.

The lengths of sleeves 208 are such as to permit the upper ends thereof to be spaced below crossbeam 170 when platform 198 is in the dashed-line position of FIG. 3.

In FIGS. 2 and 3, when a pair of filters is inserted into regions 146 through the openings defined by lids 186, the filters are supported uprightly by surfaces 200 of platform 198. The combined weight of the filters is such as to shift platform 198 downwardly, but the weight is insufficient to shift platform 198 to the full-line position of FIGS. 1 and 3. Therefore, portions of the filters protrude outwardly through the open upper ends of regions 146 and thereby, through the slots 36 of end portions 31 and 35. It is, therefore, clear that additional force is required to shift the filters to positions within regions 146 so as to permit the closing of lids 186. It is further evident that, by depressing one of the filters, the other filter is caused to move therewith within the corresponding region 146.

By closing lids 186, the filters are confined within the regions 146 so that the platform 198 is located at the full-line position of FIGS. 1 and 3. Upon the opening of lids 186, the effect of springs 210 on platform 198 is such as to cause the filters to be elevated partially out of regions 146 for handling purposes, thus facilitating the insertion and removal of the filters. When the lids 186 are in the closed position, the bolts 192 couple with catches 196 to maintain the filters within the regions 146.

Figures 5, 6:
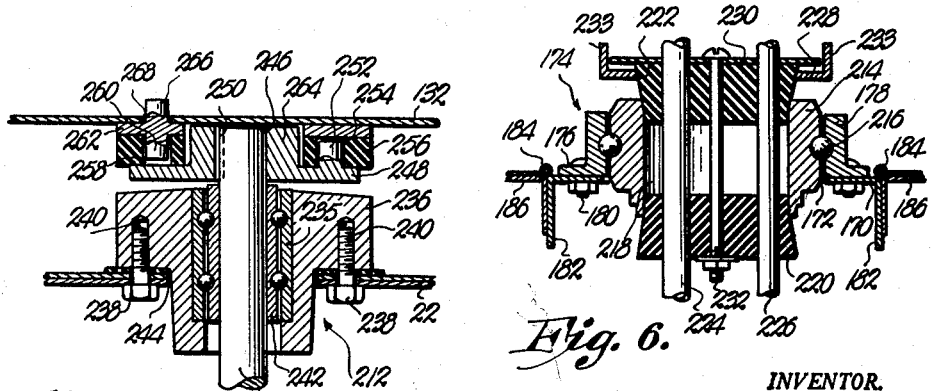
FIG. 5 is an enlarged, fragmentary, cross-sectional side elevational view of the lower bearing and shaft assembly operably coupled to the enclosure for rotating the latter.
FIG. 6 is an enlarged, fragmentary, cross-sectional, side elevational view of the upper bearing assembly operably coupled to the enclosure to support and to permit rotation of the latter in conjunction with the lower bearing of FIG. 5.

Drum 128 is rotatably mounted within central compartment 25 of housing 12 by virtue of the aforementioned top bearing 174, and a bottom bearing 212 illustrated in FIGS. 3 and 5, it being noted that the top bearing is also illustrated in FIGS. 3 and 6. Bearings 174 and 212 are centrally disposed relative to bottom wall 132 and top wall 134 so that the drum 128 rotates about the axis of revolution of side wall 130.

Top bearing 174, being a standard, commercially procurable bearing, is provided with the aforementioned outer race 178, and an inner race 214 best illustrated in FIG. 6. Inner race 214 is provided with a circular aperture 218 therein for mounting a pair of stopper members 220 and 222 of resilient, rubber-like, vibration-absorbing material. Members 220 and 222 are normally vertically disposed and provided with beveled, annular, outermost surfaces to provide a tight fit with inner race 214 when inserted into aperture 218 of the latter. Members 220 and 222 are bored to receive therethrough, a first tube 224, and a second tube 226 for permitting fluids to be conveyed to the interior of drum 128 in the space 145 thereof. Members 220 and 222 are formed from the aforesaid resilient material to reduce vibrations caused by the rotation of drum 128 and also reduces bearing wear due to possible misalignment.

A channel length 228 which is substantially rigid, illustrated in FIGS. 2 and 6, is secured to stopper member 222 by virtue of a plate 230, and nut and bolt means 232 passing through plate 230 and stopper members 220 and 222 and screw means 231, interconnecting the ends of plate 230 with length 228.

As shown in FIG. 2, length 228 is provided with opposed, longitudinally extending flanges 233 and is adapted to be secured to beams 42 on opposed side walls 14 and 16 of housing 12 by screw means 234. Thus, top bearing 174 is mounted on housing 12 so that the inner race 214 is substantially rigid to the latter. It is evident that length 228 is precluded from rotation relative to housing 12 by virtue of being rigid thereto, but crossbeam 170, in FIGS. 2, 3 and 6, and drum 128 are permitted to rotate relative to length 228 and thereby, housing 12. This, of course, assumes that drum 128 is rotatable at the bottom wall 132 thereof by virtue of bottom bearing 212.

Bottom bearing 212, illustrated in FIGS. 3 and 5, is provided with an outer race 235 which is inserted and fixed to a bearing housing 236, the latter being secured to bottom wall 22 by stud bolts 238 threadably mounted within threaded bores 240 in housing 236. Inner race 242 of bottom bearing 212, is rigid to shaft 104 heretofore described, it being clear that portions of bearing housing 236 and inner race 242, project through and depend within an opening 244 in bottom wall 22 of housing 12.

Shaft 104 extends upwardly from inner race 242 and into a circular opening 246 in a coupling element 248 as illustrated in FIG. 5. A key 250 fixes shaft 104 to coupling element 248 so that the latter is rotatable with shaft 104. Coupling element 248 is provided with a plurality of circumferentially spaced lugs 252 surrounding opening 246 therein, lugs 252 being insertable within aligned first openings 254 in mating adaptor ring 256. Ring 256 is of hard, rubber-like material for a cushioning effect between shaft 104 and bottom wall 132, and for providing a relatively high torsional rigidity.

In FIG. 5, mating ring 256 is provided with second openings 258 therein, concentric to the axis of revolution of shaft 104 and between first openings 254. Second openings 258 receive pins 260 integral with an annulus 262, it being clear that adaptor ring 256 and annulus 262 surround, and are spaced from, a central projecting portion 264 integral with element 248 and containing key 250. A plurality of pins 266 project in opposed directions relative to pins 260 and pass through aligned openings 268 in bottom wall 132 of drum 128, which openings 268 are on a circle concentric with the axis of rotation of shaft 104. It is, therefore, evident that bottom wall 132 and thereby, drum 128, is capable of being rotated about the axis of revolution of side wall 130.

As shown in FIG. 3, fluid delivery means is provided for delivering fluids to the filters disposed in the regions 146 so that the filters may be effectively cleaned and treated by the fluids. Such means includes the tubes 224 and 226 previously mentioned and illustrated in FIGS. 3 and 6, the tube 224 extending downwardly through stopper members 220 and 222 to a point spaced below the terminus of tube 226, as shown in FIG. 3. When platform 198 is elevated and is in the dashed-line position of FIG. 3, tubes 224 and 226 are disposed within opening 304 of platform 198. As platform 198 is moved downwardly, the same clears tubes 224 and 226 by virtue of the diameter of opening 204.

As shown in FIG. 3, a pair of perforated tubes 270 and 272 are mounted on tube 224 in vertical, spaced relationship for rotational movement about horizontal axes by virtue of pivot means 274 and 276 respectively. Tubes 270 and 272 are each provided with a plurality of longitudinally aligned perforations 278 therethrough, and the ends of tubes 270 and 272 are plugged, causing fluid passing therewithin to flow outwardly only through the perforations 278 thereof. As the fluid passes out of perforations 278, a back pressure is created which causes tubes 270 and 272 to rotate about the horizontal axes defined by pivot means 274 and 276. The longitudinal row of perforations 278 on one side of the corresponding pivot means of each of tubes 270 and 272 is circumferentially offset relative to the longitudinal line of perforations 278 on the opposite side of the corresponding pivot means. The purpose for this is, of course, to permit the flow of fluids outwardly from the tubes in different directions so as to obtain the optimum cleaning and treating effect of tubes 270 and 272, as well as to contribute to the creation of the aforesaid back pressure, thus augmenting the rotational force on tubes 270 and 272.

Referring further to FIG. 3, tube 226 is provided at the terminal end thereof with pivot means 280 similar to pivot means 274 and 276 so that a tube 282 may be rotatably mounted on tube 226 for movement about a horizontal axis parallel with the axes of rotation of tubes 270 and 272. Tube 282 is substantially identical to either of tubes 270 and 272.

As illustrated in FIGS. 2 and 6, tube 224 extends upwardly through stopper members 220 and 222 and through plate 230, to an elbow 84. Tube 224 thereupon continues toward side wall 16 within the cap portion 46, and then parallel with side wall 16 through intermediate wall 21 to a point adjacent outlet 70 of tank 66. Tube 224 is interconnected to outlet 70 by virtue of a pipe 286 and may also be operably coupled to a source of fluid under pressure by extending tube 224 beyond the interconnection thereof with pipe 286.

As is clear in FIGS. 2 and 6, tube 226 passes upwardly through members 220 and 222 and through plate 230, to an elbow 88. Tube 26 then continues toward side wall 14 within cap portion 46 and then parallel with side wall 14 through intermediate wall 23 to the discharge port 86 of pump 80 mounted on reservoir 74, illustrated in FIGS. 1 and 2.

Tank 66 is adapted to contain a cleaning solution such as an alkaline mixture which is commercially available, and reservoir 74 is adapted to contain a treating fluid which is capable of being heated prior to the application thereof to the filters so that, upon the cooling of the fluid after the same has been applied to the filters, the same forms a tacky adhesive suitable for removing air-borne particles from the flow of air through the filters.

Figure 7:
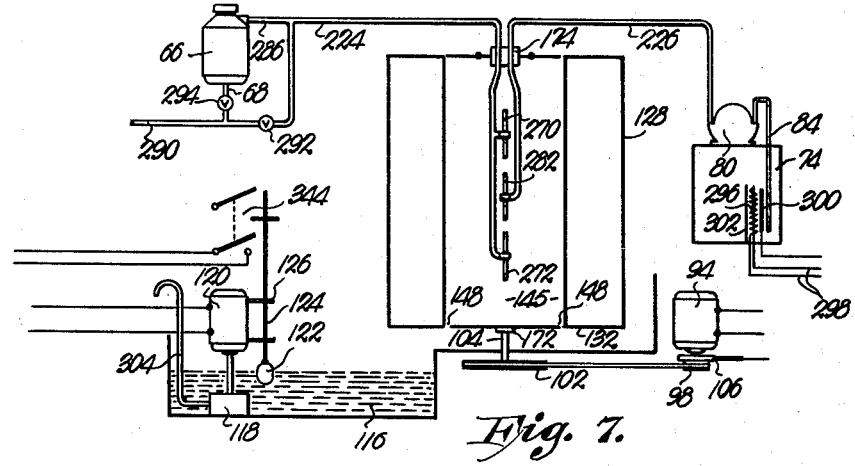
FIG. 7 is a schematic diagram of the instant invention illustrating the fluid delivery means therefor, the rotatable enclosure and the means for supplying, collecting and disposing of fluids directed to the filters to be cleaned.

FIG. 7 discloses the schematic diagram illustrating the connections of tubes 224 and 226 with respective sources of fluid, and to this end, is shown tank 66 and reservoir 74. Line 290 is operably coupled to tube 224 through a solenoid valve 292 and is further adapted to be operably coupled to a source of fluid under pressure. A solenoid valve 294 interconnects line 290 with the inlet 68 of tank 66 so that fluid may either flow from the source to which line 209 is connected into tube 224 through valve 292 independently of tank 66, or through valve 294 into and through tank 66 and then into tube 224 independently of valve 292, or fluid may flow into tank 66 as well as through valve 292 so that both the cleaning solution within tank 66 and the fluid from the source connected to line 290, enter pipe 224 for delivery toward the filters from tubes 270 and 272. By virtue of the provision of valves 292 and 294, it is possible to vary the concentration of cleaning solution of the fluid which is delivered to tubes 270 and 272.

In FIG. 7, reservoir 74 contains therewithin a heater 296 of the cartridge type which is adapted to be operably coupled to a source of electrical power through electrically conducting leads 298. A thermostatic element 300 controls a switching device for supplying voltage to leads 298 and thereby, to heater 296. Thus, the amount of heat from heater 296 imparted to the fluid in reservoir 74, is controlled by thermostatic element 300 reacting directly to the temperature of the fluid within reservoir 74. Heater 296, element 300, and the lower end of tube 84 are all housed within a chimney baffle 302. The fluid within the baffle 302 is drawn upwardly and into the suction port of pump 80 by the actuation of the latter, then forced into tube 226 and out through tube 282. Thus, the flow of heated fluid from reservoir 74 is assured.

FIG. 7 further discloses the discharge outlets 148 in bottom wall 132 of drum 128, it being noted that outlets 148 are in fluid communication with sump 116 positioned therebelow and spaced therefrom. The fluid within space 145 gravitates through outlets 148 to sump 116 and the fluids within the latter are pumped outwardly therefrom by pump 118 through an inverted J-shaped tube 304 for leading off and finally disposing of the fluids within sump 116. The ball 122 serving as a float for actuating a switch, is also illustrated, the switch means controlled by ball 122 being hereinafter described.

FIG. 7 further illustrates the provision of drive motor 94 for rotating drum 128 through shaft 104, and illustrates brake 106 secured to the pulley 98 of motor 94 for bringing the rotation of drum 128 to a halt.

FIG. 8 illustrates the electrical wiring diagram accompanying machine 10 and includes a first or master switch 306 connected to a terminal 307 and a circuit breaker 308, the latter being responsive to an overload or an under-voltage in the power line connected to the circuit. Circuit breaker 308 is connected to a heater switch 310 for actuating heater 296 in series with thermostatic element 300. A pilot light 312 is electrically connected across heater 296 to indicate the supply of voltage to the latter. A terminal 314 is electrically connected to one terminal of heater 296 and is adapted, along with terminal 307, to be connected to a source of electrical power.

Pump motor 120, FIGS. 1 and 8, for driving pump 118, FIG. 1, in sump 116, is connected in parallel across the line interconnecting circuit breaker 308 and switch 310 and the terminal 314, as illustrated in FIG. 8, thus, when switch 306 is in the closed position, pump motor 120 is energized, causing pump 118 to remove fluids from sump 116.

Drive motor 94, FIGS. 1 and 8, is electrically controlled by relay switch 318 of relay 316 in the circuit containing terminals 307, 314, and switch 306. Thus, when switch 306 is in the closed position, relay switch 316 closes and energizes drive motor 94 which furnishes motive power for rotating drum 128, FIG. 1.

Pump motor 90, FIGS. 1 and 8, is electrically controlled by relay switch 320 of relay 322 in the circuit containing terminals 307, 314, and switch 306. Thus, when relay switch 320 is actuated and is closed, pump motor 90 is energized, causing fluid treating pump 80, located on reservoir 74, FIGS. 1 and 2, to function for the purpose of supplying the treating fluid to pipe 226, FIGS. 2 and 7.

The load side of switch 306 and circuit breaker 308, connects through a fuse 324, FIG. 8, to a first single-throw, double-pole switch 326 of a conventional sequential program timing device having a timer motor 328 and cam-actuated microswitches 330, 332, 334 and 336. A knob and dial is affixed to one end of the timing motor drive shaft on which are also mounted the cams actuating the aforesaid microswitches. The aforementioned cams have been oriented on the timer motor shaft in such a manner as to cause actuation of the aforesaid microswitches in a predetermined sequence. This sequence, with the proper manual rotation of the shaft, causes the microswitch 326 to be closed, thus energizing timer motor 328. Timer motor 328 then in turn, continues the rotation of the shaft and cams through the completion of the operating cycle or until microswitch 326 is opened.

Auxiliary, functional cutout switches 338 and 340 are respectively utilized to eliminate certain phases of the operation and to de-energize drive motor 94 and thus remove the force causing rotation of drum 128, when so desired.

Single-pole, double-throw microswitch 330 is provided with a shiftable pole 331 which may be electrically connected to relay 316 by shifting into contact with fixed pole 333 to thereby energize drive motor 94 to rotate drum 128. Pole 331 may also be electrically connected to fixed pole 335 to energize solenoid 342 for actuating brake 106 and thereby, stop the rotation of drum 128.

Microswitch 332, FIG. 8, electrically controls normally closed solenoid valve 294, FIGS. 7 and 8, so that when the shiftable pole 337 of switch 332 engages fixed pole 339, valve 294 opens to permit fluid from pipe 290 to pass into tank 66 through inlet connection 68.

Microswitch 334, FIG. 8, electrically controls normally closed solenoid valve 292, FIGS. 7 and 8, so that when shiftable pole 341 of switch 334 engages fixed pole 343, valve 292 opens to permit fluid from pipe 290 to pass into pipe 224, by-passing tank 66.

It is to be noted that float switch 344, FIGS. 7 and 8, is in series circuit relationship with solenoid valves 292 and 294, and may be actuated by longitudinal movement of rod 124 secured to ball 122, FIG. 7. Upward movement of ball 122, FIG. 7, opens the normally closed switch 344 whenever fluids in sump 116 rise to an undesirably high level, thus stopping further flow of liquids into tube 224 by de-energizing valves 292 and 294 and thus permitting them to return to their normally closed positions.

Microswitch 336, FIG. 8, is provided with a shiftable pole 345, which is electrically connected to relay 322 by shifting into contact with fixed pole 346 to thereby energize pump motor 90 to supply treating fluid from reservoir 74 to tube 226 and thereby to tube 282.

The operation of the program timing device is such that switch 326 is normally closed until the entire cleaning and treating process has been accomplished. Thus, timer motor 328 is energized so as to successfully actuate switches 330, 332, 334, and 336. While switches 332, 334 and 336 are successively actuated, shiftable pole 331 of switch 330 remains in electrical contact with fixed pole 333 to thereby energize relay 316 and drive motor 94 for rotating drum 128. When switch 336 is opened to de-energize pump motor 90, shiftable pole 331 of switch 330 simultaneously shifts into electrical contact with the fixed pole 335 to energize solenoid 342 and thereby brake 106 for stopping the rotation of drum 128. After a predetermined time following the energizing of solenoid 342, switch 326 opens to de-energize timer motor 328 and interrupts the circuit to microswitches 330, 332, 334 and 336 to thereby render the program timing device inoperative.

To initiate the aforesaid cleaning and treating process, the filters are manually inserted into regions 146 and held therein by the closing of lids 186. The filters are disposed within regions 146, FIG. 3, so that the normally upstream faces thereof relative to the flow of air therethrough, are adjacent to the corresponding side walls 142 and thus are remote from the axis of revolution of drum 128. The purpose of this is to prevent a greater movement of the air-borne particles through the wire mesh of the filters than is necessary, since most of the aforementioned particles are situated at or near the normally upstream face of a filter.

By proper setting of the program timing device, drum 128, FIG. 3, may be rotated a predetermined time prior to the introduction of a cleaning fluid into tube 224. The purpose of this is to eject a number of the air-borne particles on the wire mesh of the filters by centrifugal force, and cause the particles to gravitate along side and end walls 142 and 144 to bottom wall 132, where they are subsequently removed from space 145 through outlets 148 by the admixture with cleaning and treating fluids.

As cleaning fluid passes into line 290, FIGS. 2 and 7, and then into tube 224 through either tank 66, through valve 292, or through both bank 66 and valve 292 simultaneously, the same flows into the perforated tubes 270 and 272, FIGS. 3 and 7. As the fluid leaves tubes 270 and 272 through the perforations 278 thereof, a conical spray from each perforation is created, which spray combines with the sprays issuing from adjacent perforations to form a fluid discharge that is directed toward an area traversed by the rotating filters under a pressure sufficient to penetrate the wire mesh of the filters and thus carry therewith the particles to be dislodged from the wire mesh. It is to be noted that tubes 270 and 272 are positioned so that the fluid discharge therefrom substantially covers the entire filters.

Following the application of the cleaning fluid through tubes 270 and 272, drum 128 continues to rotate to expel excess cleaning fluid particles from the wire mesh by centrifugal force. Thereupon, treating fluid is delivered from reservoir 74 to tube 282 through tube 226 by energizing the proper components. As in the case of tubes 270 and 272, the fluid issuing from each perforation of tube 282 is in the form of a conical spray and the effect of the individual sprays is to form a fluid discharge directed toward an area traversed by the filters under a pressure sufficient to penetrate the wire mesh therefor for treating the same. Further, the treating fluid discharge is sufficient to cover the filter by proper positioning of tube 282 relative to the latter.

The excess treating fluid is expelled from the wire mesh by centrifugal force after the treating fluid discharge has ceased. The rotation of drum 128, FIG. 3, is then brought to a halt and the filters are manually removed from regions 146 and the cleaning and treating process is repeated for another pair of filters.

It is preferred that the cleaning fluid to be utilized with machine 10 be water from a conventional outlet controlled by a shutoff valve. The use of water is especially advantageous since the same is generally accessible, even near locations where filters are disposed in operative positions, since the pressure of the water at the aforesaid outlets is sufficient for the purposes of machine 10, and since water is readily miscible with solutions of the type utilized in tank 66.

It is preferrred that the treating fluid to be utilized with machine 10, be a petroleum base compound, capable of being heated prior to application to the filters and capable of cooling while on the wire mesh of the filters, to form a tacky adhesive to which air-borne particles adhere.

*Operation*

To place machine 10, FIGS. 1, 2, 3 and 4, into operation, the same is moved to a location adjoining the filter installation, so that the filters may be readily removed from their respective mounting structures and conveyed a short distance to machine 10.

The utilities of machine 10 are then connected to appropriate outlets at the location, namely, line 290, FIGS. 2 and 7, is coupled to a source of water under pressure and the terminals 307 and 314 of FIG. 8, are connected to a source of electrical power. The shutoff valve at the source for controlling the flow of water is then opened and master switch 306 is then closed, energizing sump motor 120 to place pump 118 in operation. The shutoff valve remains open and switch 306 remains closed during the cleaning and treating process of filters at a particular location. Machine 10 is thus ready to receive filters to be cleaned and treated.

Lids 186 are aligned with slots 36 by manually rotating drum 128 to permit insertion of a pair of filters within regions 146. A pair of filters are inserted into corresponding regions 146, FIG. 3, and then lids 186 are closed and locked. Doors 40 are shifted toward central portion 33 to close the corresponding slots 36. The program timing device, normally located on the external surface of either side wall 14 or side wall 16, is manually actuated by rotating the knob thereon and thereby the shaft rigid to the knob for closing switch 326 and placing switches 330, 332, 334 and 336 in condition for subsequent actuation, upon which the process depends.

For each pair of filters within regions 146, the steps in the process are substantially as follows, although the order or sequence of the steps may be varied: A number of the particles are removed from the filters by centrifugal force upon energizing motor 94 to cause rotation of drum 128, water is caused to flow into and through tank 66 for admixture with cleaning solution in the latter and then into tubes 270 and 272 through pipe 286 and tube 224 when valve 294 is opened, water is caused to by-pass tank 66 and flow into tubes 270 and 272 through tube 224 to thereby remove the excess cleaning solution remaining on the filters when valve 294 is closed and valve 292 is opened, the excess water is removed from the filters by centrifugal force by the continued rotation of drum 128 after valve 292 closes, treating fluid from reservoir 74 is then delivered to tube 282 through tube 226 upon energizing motor 90 and thereby pump 80, the excess treating fluid on the filters is removed by centrifugal force by the continued rotation of drum 128 after motor 90 has been deenergized and the rotation of drum 128 is brought to a halt by energizing solenoid 342.

Doors 40, FIG. 2, are then opened and drum 128 is manually rotated until the longitudinal axes of lids 186 align with slots 36 to permit the removal of the filters within drum 128. The filters are then removed and replaced by other filters to be cleaned and treated.

After the group of filters for a particular installation have been cleaned and treated by the aforesaid process, master switch 306 is opened, the utilities are disconnected and machine 10 is then moved to location adjoining another filter installation.

A typical time cycle of operation for machine 10 for accomplishing the filter cleaning and treating process is as follows, the "x" in each case denoting that the element associated therewith is in operation:

| Total Elapsed Time (Sec.) | 10 | 20 | 30 | 40 | 50 | 60 | 70 | 80 | 90 |
|---|---|---|---|---|---|---|---|---|---|
| Time Interval (Sec.) | 10 | 10 | 10 | 10 | 10 | 10 | 10 | 10 | 10 |
| Rotation of Drum 128 | x | x | x | x | x | x | x | x | |
| Actuation of Valve 294 | | x | x | | | | | | |
| Actuation of Valve 292 | | | | x | x | | | | |
| Energization of Motor 90 | | | | | | | x | | |
| Energization of Solenoid 342 | | | | | | | | | x |

It is to be noted that the steps above are merely representative and the time intervals thereof and combinations may be varied, depending upon the condition of the filters to be cleaned and treated.

Sufficient space is provided in end compartment 27 adjacent tank 66 for storing the hoses and electrical conducting wires for connecting to the utilities. An access door is provided in the end wall 18 so as to permit immediate access to the wires and hoses for quick and easy connection to the utilities adjacent to the filters at their point of use.

Although the operation of machine 10 has been disclosed as being dependent upon utilities adjacent to the points of use of the filters, machine 10 may be wholly self-contained by initially filling tank 66 and reservoir 74 with a cleaning fluid and a treating fluid respectively. During operation of machine 10, the waste fluids gravitate to sump 116 and the action of pump 118 causes the fluids to be returned to tank 66 and reservoir 74 respectively, for reuse as cleaning and treating agents. Sump 116 may be divided into separate compartments which are valve controlled, to receive the fluids passing through outlets 148 so that one of the compartments may receive fluid to be re-pumped back to tank 66, whereas the other compartment may receive fluids to be re-pumped to reservoir 74. In this respect, machine 10 need not be utilized with water and waste utilities but only with an electric utility and, therefore, may be used at points within a building for instance, which are not provided with utilities except electrical, required for the above-described operation.

Having thus described the invention, what is claimed as new and desired to be secured by Letters Patent is:

1. In apparatus for the fluid treatment of a member:
an enclosure having means therein presenting a member-receiving space and having an opening aligned with said space through which a member passes to be received within the space;
a closure element movable across said opening to maintain a member within said space;
means biasing a member within the enclosure in a direction and with a force sufficient to cause said member to extend at least partially out of said enclosure through said opening when said closure element is moved to a location clearing said opening;
means mounting said enclosure for rotation;
means coupled with said enclosure for rotating the same to thereby rotate a member therewithin; and
fluid delivery means extending into said enclosure and adapted to be operably coupled to a source of fluid for directing the fluid against a member received within and rotated by said enclosure, whereby the member is treated by the fluid.

2. In apparatus as set forth in claim 1, wherein said biasing means includes a member-engageable platform movable toward and away from the opening, and a spring for biasing the platform toward said opening.

3. In apparatus for the fluid treatment of a member:
an enclosure having an imperforate side wall, a bottom provided with a fluid discharge outlet and means therewithin presenting a member-receiving space;
means mounting said enclosure for rotation about a generally upright axis;
means coupled with said enclosure for rotating the latter and thereby a member received therewithin;
fluid delivery means extending into said enclosure and adapted to be operably coupled to a source of fluid for directing said fluid against said member to thereby treat the same;
a sump disposed below said enclosure for receiving fluid passing out of the same through said outlet; and
a baffle surrounding said enclosure above and in relatively close proximity to the lower extremity of said sidewall, said baffle being disposed for preventing fluid discharged through said outlet from rising along said side wall upon impact with said sump and fluid within the sump.

4. In apparatus for the fluid treatment of a member:
a support;
a generally cylindrical drum having a top and bottom and provided with means therewithin presenting a pair of member-receiving spaces on opposed sides of the central axis thereof, said top having a pair of openings aligned with said spaces respectively to permit a pair of members to pass into the spaces;
adaptor means in said drum for each space respectively to selectively vary the size of the corresponding space and thereby accommodate the same for members of different dimensions;
means mounting said drum on the support for rotation about said central axis;
means coupled with said drum for rotating the same and thereby a pair of members in the spaces therof;
a pair of tubes each having a number of fluid delivery orifices therein along the length thereof and adapted to be operably coupled to a respective source of fluid;
means mounting said tubes in spaced relationship on said support with said tubes extending into said drum adjacent said central axis and within the region circumscribed by the member; and
means coupled with said tubes for controlling the flow of the respective fluids therethrough, whereby the member may be treated with a first fluid passing through one of said tubes and subsequently treated by a second fluid passing through the other tube.

5. In apparatus for the fluid treatment of a member:
a support;
an enclosure having means therein presenting a member-receiving space and provided with an opening aligned with said space through which a member passes to be received within the space;
means coupled with said enclosure for varying the size of said space to permit members of different dimensions to be received within said enclosure;
a closure element movable across said opening to maintain a member within said space;
means biasing a member within the enclosure in a direction and with a force sufficient to cause said member to extend at least partially out of said enclosure through said opening when said closure element is moved to a location clearing said opening;
means mounting said enclosure on said support for rotation relative thereto about a generally upright axis spaced from said member-receiving space;
means coupled with said enclosure for rotating the same to thereby rotate a member therewithin;
fluid delivery means carried by said support, extending into said enclosure within the region circumscribed by a rotating member and adapted to be operably coupled with a source of fluid for directing a fluid against a member received within and rotated by said enclosure;
means coupled with said enclosure for exhausting therefrom the air adjacent said member to thereby assure that the fluid will be directed against said member without interference from the air adjacent thereto;
a sump disposed below said enclosure, the latter having an imperforate side wall and a bottom provided with a fluid discharge outlet aligned with the sump for discharging fluid into the latter;
a baffle surrounding said enclosure above and in relatively close proximity to said bottom, said baffle being disposed for preventing fluid discharged through said outlet from rising along said side wall upon impact with said sump and the fluid within the sump; and
means coupled with said fluid delivery means for controlling the flow of fluid therethrough.

6. In apparatus for the fluid treatment of a member:
an enclosure having means therein presenting a member-receiving space;
an adapter element swingably mounted on said enclosure and having a member-engaging stretch movable into and out of said space to vary the size of the latter and thereby permit members of different dimensions to be received within said enclosure;
means mounting said enclosure for rotation about an axis disposed adjacent to said space;
means coupled with said enclosure for rotating the same to thereby rotate a member therewithin; and
fluid delivery means adapted to be operably coupled to a source of fluid and extending into said enclosure within the region circumscribed by a rotating member for directing said fluid outwardly of said region and against said member as the latter is rotated, whereby the member is treated by said fluid.

7. In apparatus as set forth in claim 6, wherein the center of mass of said adapter element is disposed at one side of a line passing through the axis of rotation of said enclosure and the axis of swinging movement of said adapter element when said stretch is in said space and on said one side, whereby the adapter element is maintained in a fixed position by centrifugal force.

8. In apparatus as set forth in claim 6, wherein the center of mass of said adapter element is disposed on one side of a line passing through the axis of rotation of said enclosure and the axis of swinging movement of said adapter element when said stretch is in said space and on said one side of the line, the center of mass of said adapter element being disposed on the opposite side of said line when said stretch is out of said space and on said opposite side of the line.

9. In apparatus for the fluid treatment of a member:
an enclosure having means therewithin presenting a member-receiving space and provided with a bottom having a fluid discharge outlet;
means mounting said enclosure for rotation;
means coupled with said enclosure for rotating the same to thereby rotate a member therewithin;
fluid delivery means extending into said enclosure and adapted to be operably coupled to a source of fluid for directing the fluid against a member received within and rotated by said enclosure; and
a tube communicating with said outlet externally of said enclosure and extending in a direction substantially opposite to the direction of rotation of said enclosure for exhausting the air adjacent to said member from the enclosure to thereby assure that the fluid will be directed against the member without interference from said adjacent air.

10. In apparatus for the fluid treatment of a member:
an enclosure having means therein presenting a member-receiving space;
an adapter element;
means securing said adapter element to said enclosure for movement into and out of said space to selectively vary the size of the latter and thereby permit members of different dimensions to be received within said enclosure;
means mounting said enclosure for rotation;
means coupled with said enclosure for rotating the same to thereby rotate a member therewithin; and
fluid delivery means extending into said enclosure and adapted to be operably coupled to a source of fluid for directing the fluid against a member received within and rotated by said enclosures, whereby the member is treated by the fluid.

References Cited in the file of this patent
UNITED STATES PATENTS

| | | |
|---|---|---|
| 1,156,424 | Murray | Oct. 12, 1915 |
| 1,492,922 | Knight | May 6, 1924 |
| 1,681,839 | Breton | Aug. 21, 1928 |
| 1,712,751 | Cunningham | May 14, 1929 |
| 1,759,157 | Gere | May 20, 1930 |
| 1,949,814 | Replogle | Mar. 6, 1934 |
| 2,015,566 | Lowry | Sept. 24, 1935 |
| 2,025,592 | Kelly | Dec. 24, 1935 |
| 2,178,701 | Petre | Nov. 7, 1939 |
| 2,471,506 | Wiswall | May 31, 1949 |
| 2,515,702 | Douglas | July 18, 1950 |
| 2,575,394 | Hilliker | Nov. 20, 1951 |
| 2,893,410 | Frekko | July 7, 1959 |